(12) United States Patent
Rosenkilde et al.

(10) Patent No.: US 11,853,732 B1
(45) Date of Patent: Dec. 26, 2023

(54) SOURCE CODE STRUCTURAL INFERENCE BASED ON INDENTATION

(71) Applicant: Microsoft Technology Licensing, LLC, Redmond, WA (US)

(72) Inventors: Johan Sebastian Heesemann Rosenkilde, Birkerød (DK); Albert Ziegler, Uppsala (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/845,739

(22) Filed: Jun. 21, 2022

(51) Int. Cl.
*G06F 8/41* (2018.01)
*G06F 8/33* (2018.01)

(52) U.S. Cl.
CPC ............... *G06F 8/427* (2013.01); *G06F 8/33* (2013.01); *G06F 8/433* (2013.01)

(58) Field of Classification Search
None
See application file for complete search history.

(56) References Cited

U.S. PATENT DOCUMENTS

| | | | | |
|---|---|---|---|---|
| 2003/0177136 A1* | 9/2003 | Alpert | ...................... | G06N 5/02 706/45 |
| 2007/0226708 A1* | 9/2007 | Varma | ...................... | G06F 8/51 717/139 |
| 2007/0256062 A1* | 11/2007 | Madden | ............... | G06F 11/3664 714/E11.207 |
| 2008/0059506 A1* | 3/2008 | Kalia | ................... | G06F 16/9024 707/999.102 |
| 2018/0364992 A1* | 12/2018 | Yamamoto | ............... | G06F 8/427 |

FOREIGN PATENT DOCUMENTS

CN 113378544 A 9/2021

OTHER PUBLICATIONS

U.S. Appl. No. 14/850,440, filed Sep. 10, 2015.
Jonge, et al., "Natural and Flexible Error Recovery for Generated Parsers", In Proceedings of the Software Language Engineering: Second International Conference, Oct. 5, 2009, pp. 204-223.
"International Search Report and Written Opinion Issued in PCT Application No. PCT/US23/022531", dated Aug. 14, 2023, 11 Pages. (MS# 411613-WO-PCT).

* cited by examiner

*Primary Examiner* — Ryan D. Coyer
(74) *Attorney, Agent, or Firm* — Workman Nydegger

(57) ABSTRACT

Inferring source code structure based on indentation. A portion of source code comprising a plurality of lines is identified, and a corresponding indentation level for each line is determined. A plurality of nodes, each representing a different line in the plurality of lines are generated. The nodes are arranged into an ordered tree based on the corresponding indentation level for each line. Based on an identified line in the plurality of lines, a subset of the plurality of lines are identified from the ordered tree, based on identifying a subtree that comprises a node representing the identified line. A source code action is initiated based on the subset of the plurality of lines.

20 Claims, 7 Drawing Sheets

```
01. // A simple program to
02. // compare numbers
03.
04. namespace Numbers
05. {
06. →class Compare
07. →{
08. →→static void Main(string[] args)
09. →→{
10. →→→NumberCompare(9, 10);
11. →→}
12. →→private static void NumberCompare(
13. →→→int num1,
14. →→→int num2)
15. →→{
16. →→→if (num1 > num2)
17. →→→→System.Console.WriteLine(num1 + " is greater than " + num2);
18. →→→else if (num1 == num2)
19. →→→→System.Console.WriteLine(num1 + " is equal to " + num2);
20. →→→else
21. →→→→System.Console.WriteLine(num1 + " is less than " + num2);
22. →→}
23. →}
24. }
```

*FIG. 3*

SOURCE CODE STRUCTURAL INFERENCE BASED ON INDENTATION

BACKGROUND

In computing, parsing, syntax analysis, or syntactic analysis refers to a formal analysis by a computer of an input string, resulting in identification of constituent parts of the input string, and in identification of syntactic relationships between those constituent parts. When applied to the analysis of computer languages, parsing refers to the syntactic analysis of input code into its component parts, which facilitates compilation, interpretation, etc. A source code parser is a software component that parses computer source code. Source code parsers are written to target a specific source code language (or languages), based on detailed knowledge of the grammar rules of the target source code language(s). Source code parsers take input source code and build a data structure, such as an abstract syntax tree (AST), that captures the exact structure of the source code, according to the grammar rules of a language in which the source code was written.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method, implemented at a computer system that includes a processor, for inferring source code structure based on indentation, the method including: identifying a portion of source code including a plurality of lines; determining a corresponding indentation level for each line in the plurality of lines; generating a plurality of nodes that each represents a different line in the plurality of lines; arranging the plurality of nodes into an ordered tree based at least on the corresponding indentation level for each line in the plurality of lines; based on an identified line in the plurality of lines: identifying, from the ordered tree, a subtree that includes a node representing the identified line; identifying a subset of the plurality of nodes that correspond to the subtree; and identifying a subset of the plurality of lines that are represented by the subset of the plurality of nodes as being syntactically-related to the identified line; and initiating a source code action based on the subset of the plurality of lines.

In some aspects, the techniques described herein relate to a computer system for inferring source code structure based on indentation, including: a processor; and a computer storage media that stores computer-executable instructions that are executable by the processor to cause the computer system to at least: identify a portion of source code including a plurality of lines; determine a corresponding indentation level for each line in the plurality of lines; generate a plurality of nodes that each represents a different line in the plurality of lines; arrange the plurality of nodes into an ordered tree based at least on the corresponding indentation level for each line in the plurality of lines; based on an identified line in the plurality of lines: identify, from the ordered tree, a subtree that includes a node representing the identified line; identify a subset of the plurality of nodes that correspond to the subtree; and identify a subset of the plurality of lines that are represented by the subset of the plurality of nodes as being syntactically-related to the identified line; and initiate a source code action based on the subset of the plurality of lines.

In some aspects, the techniques described herein relate to a computer program product including a computer storage media that stores computer-executable instructions that are executable by a processor to cause a computer system to infer source code structure based on indentation, the computer-executable instructions including instructions that are executable by the processor to cause the computer system to at least: identify a portion of source code including a plurality of lines; determine a corresponding indentation level for each line in the plurality of lines; generate a plurality of nodes that each represents a different line in the plurality of lines; arrange the plurality of nodes into an ordered tree based at least on the corresponding indentation level for each line in the plurality of lines; based on an identified line in the plurality of lines: identify, from the ordered tree, a subtree that includes a node representing the identified line; identify a subset of the plurality of nodes that correspond to the subtree; and identify a subset of the plurality of lines that are represented by the subset of the plurality of nodes as being syntactically-related to the identified line; and initiate a source code action based on the subset of the plurality of lines.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which:

FIG. 3 illustrates an example of source code that includes indentation;

DETAILED DESCRIPTION

While conventional source code parsers are very powerful, there are challenges with using them in many contexts— such as when they need to deal with many different programming languages and need to work for all or most of them, when they need to deal with code in a partially completed state, and/or in which responsiveness is a priority (e.g., when parsing is integral to a human-interactive experience). For example, some source code editors provide intelligent interactive suggestions based on an understanding of the code being authored and/or based on an understanding of code that is related to the code being authored. At least some embodiment herein are directed to source code structural inference based on indentation. Unlike conventional parsers, which capture the exact structure of source code using grammar rules, the embodiments described herein parse "partially" based on indentation. These embodiments are fast, require fewer computing resources than traditional parsing, and capture overall structural properties of even partially completed source code that contains errors.

Figure 1:
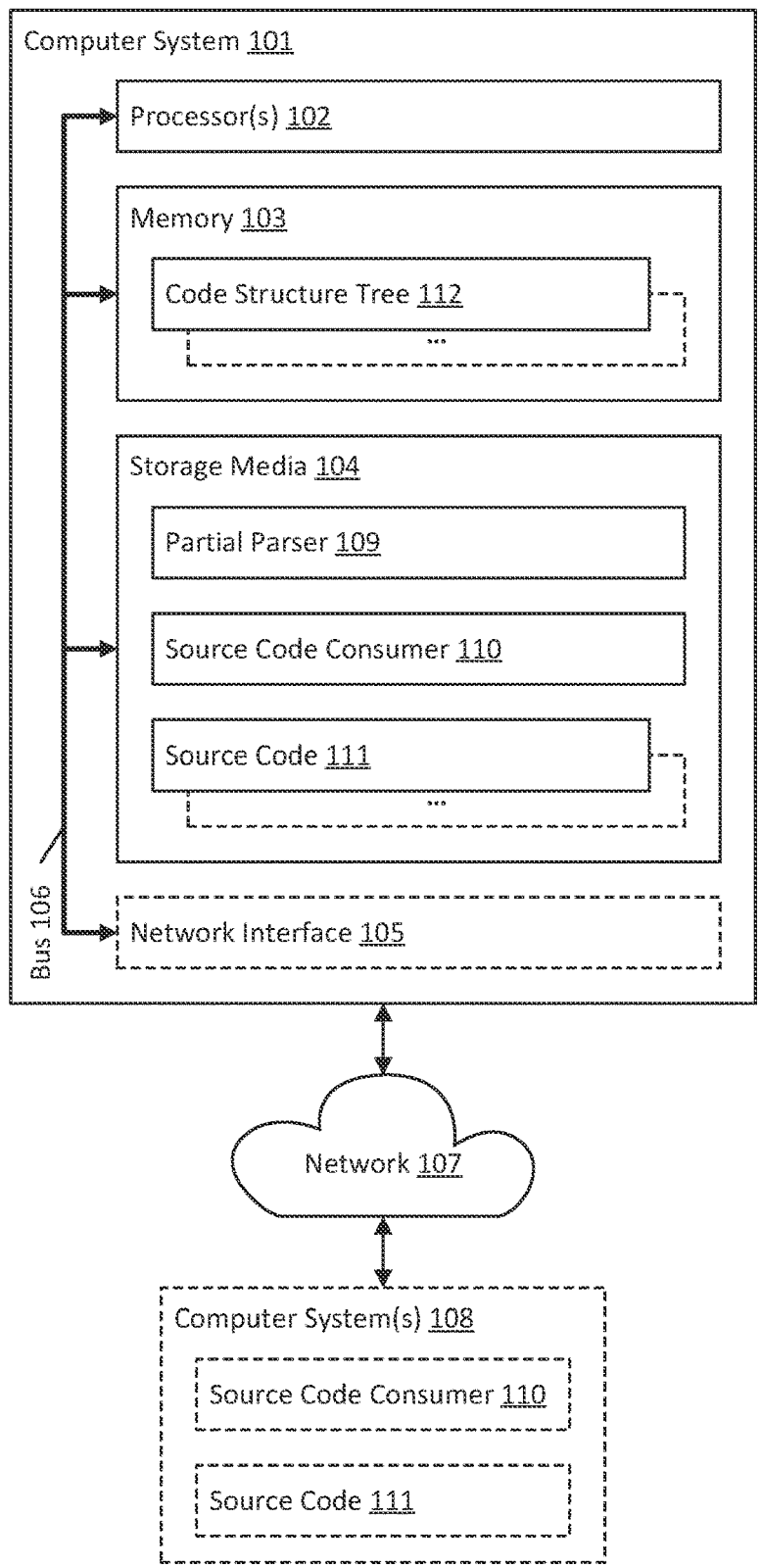
FIG. 1 illustrates an example computer architecture that facilitates source code structural inference based on indentation.

FIG. 1 illustrates an example computer architecture 100 that facilitates source code structural inference based on indentation. As shown, computer architecture 100 includes a computer system 101 comprising processor(s) 102 (e.g., a single processor, or a plurality of processors), memory 103 (e.g., system or main memory), storage media 104 (e.g., a single computer-readable storage medium, or a plurality of computer-readable storage media), all interconnected by a bus 106. Computer system 101 may also include a network interface 105 (e.g., one or more network interface cards) for interconnecting (via a network 107) to computer system(s) 108 (e.g., a single computer system, or a plurality of computer systems).

The storage media 104 is illustrated as storing computer-executable instructions implementing a partial parser 109. Additionally, the computer architecture 100 is shown as including source code 111 (e.g., one or more portions of source code stored in storage media 104 and/or at computer system(s) 108) on which the partial parser 109 operates. In embodiments, the source code 111 comprises source code files (e.g., stored on a non-volatile medium such as storage media 104), or source code within an editor buffer (e.g., stored on a volatile medium such as memory 103).

In embodiments, the partial parser 109 parses the source code 111 to generate a code structure tree 112 that captures the overall structure of the source code 111. The partial parser 109 operates on the basis that humans, and many source code editors, generally adhere to strong conventions around the use of indentation when authoring source code even though, in most source code languages, indentation is completely optional. Thus, unlike a conventional parser that parses source code based on a strict grammar in which the source code was written, the partial parser 109 described herein parses "partially" based on indentation contained within the source code 111. Since the partial parser 109 parses based on indentation, rather than grammar rules, the code structure tree 112 may only capture a partial structure of the source code 111 (rather than an exact structure, as would be the case for a conventional parser). Nonetheless, this code structure tree 112 is still useful for many source code actions, as described herein.

In embodiments, by parsing source code based on indentation, rather than based on strict grammatical rules, the partial parser 109 infers overall code structure more quickly and more efficiently than is possible with a conventional parser. Additionally, since the partial parser 109 operates based on indentation, rather than on strict grammatical rules, the partial parser 109 can infer overall code structure even when the input source code is partially completed and/or contains errors. In embodiments, these advantages make the partial parser 109 useful for use in connection with a source code consumer 110 that deals with many different programming languages and needs to work for all or most of them, that deals with code in a partially completed state, and/or in which responsiveness is a priority (e.g., when the source code consumer 110 is human-interactive). For example, these advantages make the partial parser 109 useful in connection with a code editor—such as VISUAL STUDIO from MICROSOFT CORPORATION, COPILOT from GITHUB, and the like—that provides intelligent source code completion suggestions based on having an understanding the overall structure of the code being authored.

In embodiments, the partial parser 109 operates by passing over source code 111 to generate a code structure tree 112 based on indentation within the source code 111. In embodiments, during this pass, each line of the source code 111 is converted into a node, and these nodes are arranged based on an indentation level of their respective line. In embodiments, during this pass, blank lines (e.g., lines containing no characters at all, or lines containing only whitespace characters) are grouped with their most recent non-blank ancestor (e.g., lines containing at least one non-whitespace character).

In some embodiments, the partial parser 109 also makes one or more additional passes over the code structure tree 112 to refine the code structure tree 112 based on common source code syntax. For example, the partial parser 109 may refine the code structure tree 112 by labeling nodes to identify common source code constructs like classes or functions, and/or may refine the code structure tree 112 by regrouping nodes as subordinate clauses to their parents—such as based on common "continuation" words (e.g., same-level control flow words such as 'then' or 'else') or symbols (e.g., braces) contained in source code.

In embodiments, as a result of these one or more passes, the partial parser 109 generates a code structure tree 112 that defines many elements of an AST that would have been obtained by conventional parsing using strict grammatical rules, but the partial parser 109 does so in a way that is robust against code incompleteness and errors, that is very fast and computationally-efficient to do, and that works for a variety of source code languages.

Figure 2:
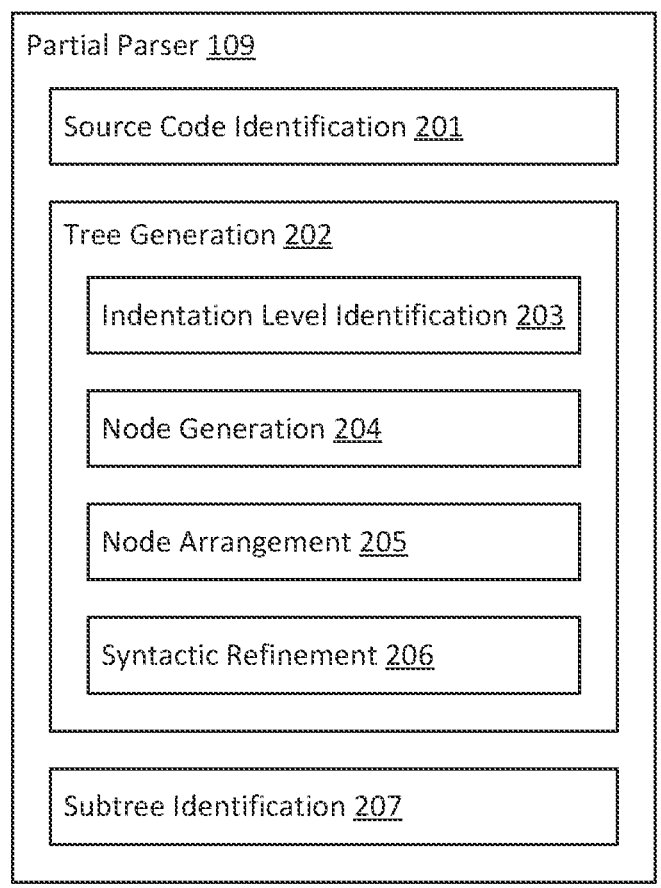
FIG. 2 illustrates an example of internal components of a partial parser that infers code structure based on indentation.

FIG. 2 illustrates an example 200 of internal components of the partial parser 109 of FIG. 1. Each internal component of the partial parser 109 depicted in FIG. 2 represents various functionalities that the partial parser 109 might implement in accordance with various embodiments described herein. It will be appreciated, however, that the depicted components—including their identity and arrangement—are presented merely as an aid in describing example embodiments of the partial parser 109.

The partial parser 109 includes a source code identification component 201. In embodiments, the source code identification component 201 identifies a portion of source code (source code 111) from which the partial parser 109 will generate a code structure tree 112. In some embodiments, the source code 111 is a file stored on the storage media 104 and/or obtained from computer system(s) 108. In some embodiments, the source code 111 resides in the memory 103, such as corresponding to a buffer within a code editor corresponding to the source code consumer 110. In embodiments, the source code 111 includes multiple levels of indentation, either due to a grammar of a language in which the source code 111 is written (e.g., in the case of Python), or due to human and/or editor convention (e.g., in the case of C, C++, C#, JAVA, and the like).

FIG. 3 illustrates an example 300 of source code 301 that includes indentation. In particular, source code 301 is a portion of C# source code defining a program that compares two integers, and that prints out whether those integers are equal, or whether one is greater or less than the other. In example 300, the source code 301 includes multiple levels of indentation, with each level of indentation visually indicated with an arrow (i.e., →). In embodiments, each level of indentation is defined using one or more tab characters, using one or more space characters, or using combinations of tab and space characters.

The partial parser 109 also includes a tree generation component 202. In embodiments, the tree generation component 202 generates a code structure tree 112, which is an ordered tree that captures the overall structure of the source code 111 obtained by the source code identification component 201, based on parsing "partially" using indentation contained within the source code 111. As will be appreciated by one of ordinary skill in the art, the tree generation component 202 can represent the code structure tree 112 in a variety of ways. For example, using an object-oriented approach, each node is an object (e.g., a dedicated memory allocation) with pointer(s) to its array of children. More compact approaches may use arrays of integers and bit-packing to represent the children of a given node. Other approaches are also possible, and within the scope of this disclosure. The tree generation component 202 includes an indentation level identification component 203, a node generation component 204, and a node arrangement component 205.

In embodiments, the indentation level identification component 203 identifies an indentation level for each line within the source code 111 obtained by the source code identification component 201. In embodiments, for blank lines (e.g., line 03 in source code 301), the indentation level identification component 203 uses the indentation level of its most recent non-blank ancestor (e.g., line 02 in source code 301). Referring to source code 301, in one example, the indentation level identification component 203 identifies indentation levels as shown in Table 1:

TABLE 1

| Line Number | Indentation Level |
|---|---|
| 01 | 0 |
| 02 | 0 |
| 03 | 0 (see line 02) |
| 04 | 0 |
| 05 | 0 |
| 06 | 1 |
| 07 | 1 |
| 08 | 2 |
| 09 | 2 |
| 10 | 3 |
| 11 | 2 |
| 12 | 2 |
| 13 | 3 |
| 14 | 3 |
| 15 | 2 |
| 16 | 3 |
| 17 | 4 |
| 18 | 3 |
| 19 | 4 |
| 20 | 3 |
| 21 | 4 |
| 22 | 2 |
| 23 | 1 |
| 24 | 0 |

In embodiments, the node generation component 204 generates a node corresponding to each line within the source code 111 obtained by the source code identification component 201, and the node arrangement component 205 arranges these nodes into an ordered tree structure (code structure tree 112) based on the indentation levels identified by the indentation level identification component 203, and based on an ordering of lines within the source code 111.

Figure 4A:
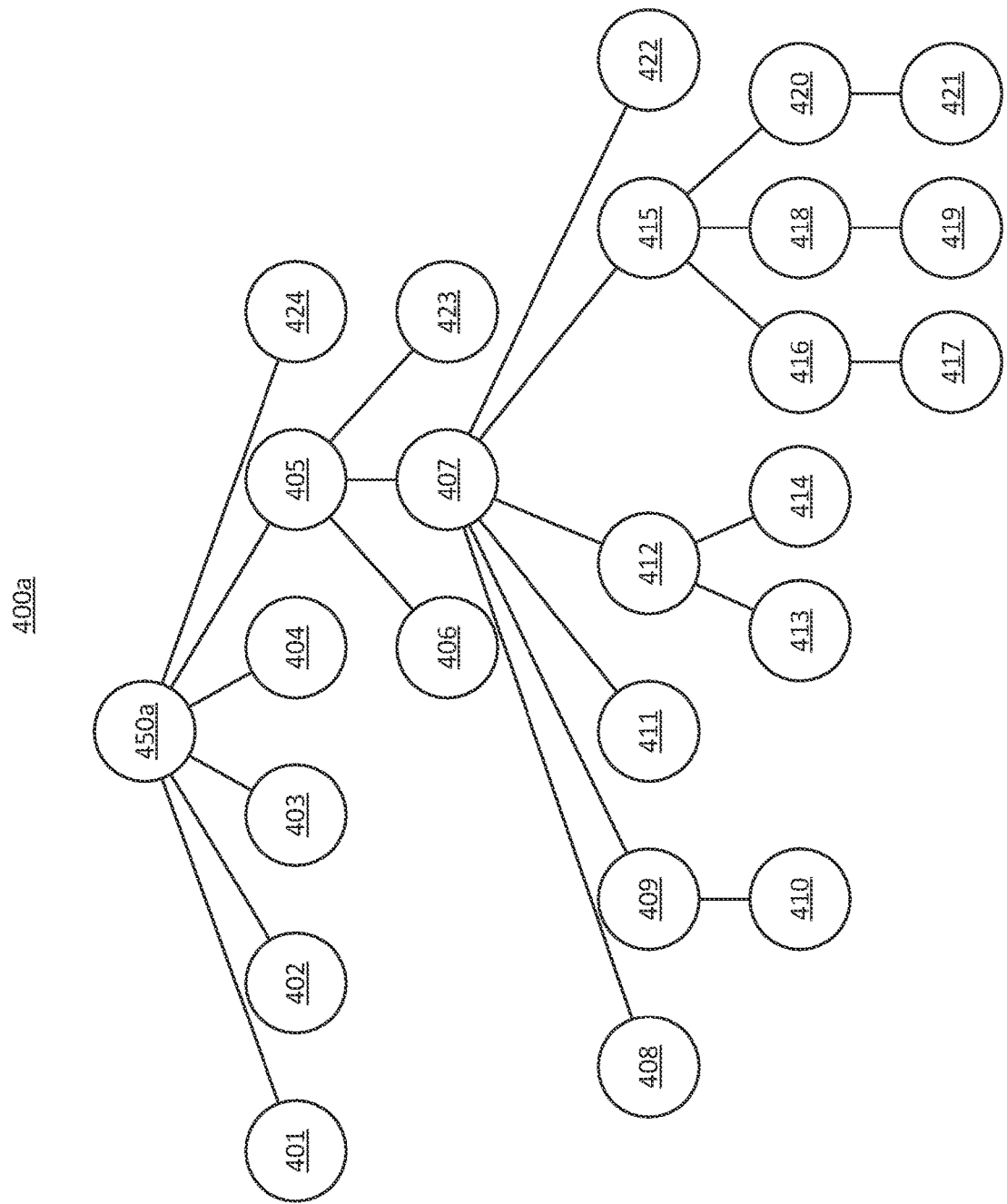
FIG. 4A illustrates an example of generation of an ordered code structure tree based on source code indentation.

FIG. 4A illustrates an example 400a of generation of an ordered code structure tree (e.g., code structure tree 112) based on source code indentation. Notably, example 400a is one illustrative example only, and it will be appreciated that alternate code structure trees could be generated based on indentation from source code 301 without deviating from the principles described and claimed herein.

Example 400a includes a node 450a, which is a virtual root node of the ordered code structure tree. In embodiments, node 450a represents, or otherwise corresponds to, the source code 111 generally. For example, node 450a may refer to a source code file stored on the storage media 104, to a buffer within the source code consumer 110, etc. Below node 450a, example 400a includes a hierarchy of nodes, including node 401 (corresponding to line 01 of source code 301), node 402 (corresponding to line 02 of source code 301), and so on to node 424 (corresponding to line 24 of source code 301).

In example 400a, an arrangement of the hierarchy of nodes within the ordered code structure tree is based on the indentation levels of each line as identified in Table 1, as well as the order in which the lines appear within the source code 301. In general, if a line has a greater indentation level than its preceding line within source code 301, then a node corresponding to that line is arranged a child of a node that corresponds to the preceding line. Additionally, in general, if a line has the same indentation level as its preceding line within source code 301, then a node corresponding to that line is arranged as a sibling of a node that corresponds to the preceding line. Additionally, in general, if a line has a lower indentation level than its preceding line within source code 301, then a node corresponding to the that line is arranged as sibling of a node corresponding to the most recent line having that lower indentation level. Notably, exceptions to these general rules, and special cases, may exist. For instance, there could be situations, such as with "offside indentation," in which the indentation level of a given line decreases compared to its previous line, but in which this decreased indentation level is still higher than an ancestor of the previous line. This frequently occurs when specifying the parameters of function declarations. For example, in python:

01. def my_function(x : int,
02. ↦ ↦ ↦ ↦ ↦ ↦ y : int,
03. ↦ ↦ ↦ ↦ ↦ ↦ z : int):
04. ↦ print(x,y,z)

Here, line 04 has a lower indentation level than lines 02 and 03, but a higher indentation level than line 01. In this case, a node corresponding to line 04 may be arranged as a sibling to nodes corresponding to lines 02 and 03 (which may all be arranged as children of a node corresponding to line 01). There could be other options, such as introducing virtual nodes for each level of indentation that appears under line 01.

In example 400a, node 401 (line 01, a comment), node 402 (line 02, a comment), node 403 (line 03, a blank line), and node 404 (line 04, a namespace definition), node 405 (line 05, a left brace associated with the namespace definition), and node 424 (line 24, a right brace associated with the namespace definition) each have an indentation level of zero and are arranged as children of node 450a (and as siblings).

Node 406 (line 06, a class definition), node 407 (line 07, a left brace associated with the class definition), and node 423 (line 23, a right brace associated with the class definition) each have an indentation level of one and are arranged as children of node 405 (and as siblings). Node 408 (line 08, a Main method definition), node 409 (line 09, a left brace associated with the Main method declaration), node 411 (line 11, a right brace associated with the Main method declaration), node 412 (line 12, a NumberCompare method declaration), node 415 (line 15 a left brace associated with the NumberCompare method declaration), and node 422 (line 22, a right brace associated with the NumberCompare method declaration) each have an indentation level of two and are arranged as children of node 407 (and as siblings). Node 410 (line 10, a function call to NumberCompare) has an indentation level of three, and is arranged as a child of node 409 . Node 413 (line 13, a first parameter of the NumberCompare method declaration) and node 414 (line 14, a second parameter of the NumberCompare method declaration) also have an indentation level of three, and are arranged as children of node 412 (and as siblings). Node 416 (line 16, an if statement), node 418 (line 18, and else statement), and node 420 (line 20, and else statement) also have an indentation level of three, and are arranged as children of node 415 (and as siblings). Finally, node 417 (line 17, the body of the if statement), node 419 (line 19, the body of an else statement), and node 421 (line 21, the body of an else statement) have an indentation level of four, and are arranged as children of node 416, node 418, and node 420, respectively.

Notably, the ordered code structure tree illustrated in example 400*a* is based on indentation and the ordering of lines within source code 301, and without regard for grammar/syntax within source code 301. Nonetheless, the ordered code structure tree illustrated in example 400*a* generally corresponds to the structure of the source code 301. For example, lines defining the namespace declared at line 04 generally correspond to descendants of node 405, lines defining the class declared at line 06 generally correspond to descendants of node 407, lines defining the Main method declared at line 08 generally correspond to descendants of node 409, and so on. Thus, even in this form, the ordered code structure tree illustrated in example 400*a* is useful for inferring overall structure of source code 301.

The tree generation component 202 also includes a syntactic refinement component 206. In embodiments, the syntactic refinement component 206 further refines the ordered code structure tree generated by the node arrangement component 205 using partial code syntax derived from the source code 301. In embodiments, the syntactic refinement component 206 leverages syntax that is common among a variety of programming languages, thus avoiding the need to rely on a detailed understanding of the grammars of particular programming languages.

In a first embodiment, the syntactic refinement component 206 labels nodes to identify common source code constructs, like classes or functions. For example, referring to example 400*a*, the syntactic refinement component 206 may label node 404 as declaring a namespace, may label node 406 as declaring a class, may label node 408 as declaring a method, and so on.

In a second embodiment, which can be performed single or in combination with the first embodiment, the syntactic refinement component 206 regroups nodes as subordinate clauses to their parents, such as based on common "continuation" words or symbols. As examples, continuation words may include keywords for same-level control flow (e.g., 'then', 'else', 'elseif', 'elif', 'catch', 'except', 'finally', 'ensure'), end keywords (e.g., 'fi', 'esac', 'done', 'end', 'endif', 'loop', 'until', 'where', 'when'), and the like. As examples, continuation symbols may include brace control symbols (e.g., '{', '}', '[', ']', '(, ')'), multi-line string endings (e.g., '"""', """), multi-line comment endings (e.g., '*/', ''), and the like. In embodiments, a common feature of continuation words and symbols is that they generally appear at the same indentation level as a preceding line, even though they are syntactically subordinate to that line.

In one example, an if . . . else block is commonly written in the form of:
    if (condition)
        action
    else
        action
Here, the 'else' keyword is at the same indentation level as the 'if' keyword, even though it is syntactically subordinate to the 'if' keyword.

In another example, a multi-line comment may be written in the form of:
    // comment line 1
    // comment line 2
Here, the '//' symbol of second line has the same indentation level as the '//' symbol of the first line, even though the two lines operate together as a single multi-line comment.

In this second embodiment, the syntactic refinement component 206 defines a set of continuation words and/or symbols, and uses those continuation words and/or symbols to apply further structure to the ordered code structure tree generated by the node arrangement component 205 based on indentation. In embodiments, the syntactic refinement component 206 accomplishes this by identifying a line starting with a continuation word and/or symbol, and by giving that line the same indentation level as its immediately-preceding ancestor. In some embodiments, the syntactic refinement component 206 defines the set of continuation words and/or symbols using regular expressions to increase the applicability of those continuation words and/or symbols to a variety of programming languages.

In a third embodiment, which can be performed singly or in combination with the first embodiment or the second embodiment, the syntactic refinement component 206 regroups nodes based on insertion of a virtual node into the code structure tree. As examples, the syntactic refinement component 206 can use virtual nodes to group nodes representing lines that logically belong together, such as by grouping a sigil with a function declaration that it annotates, or by grouping a function declaration with its parameters when those parameters are defined using a multi-line format (e.g., as shown in lines 12-14 of source code 301).

In embodiments, the syntactic refinement component 206 operates in an iterative, multi-pass manner that refines the code structure tree with each pass, and which can repeat a given refinement type using any number of passes.

Figure 4B:
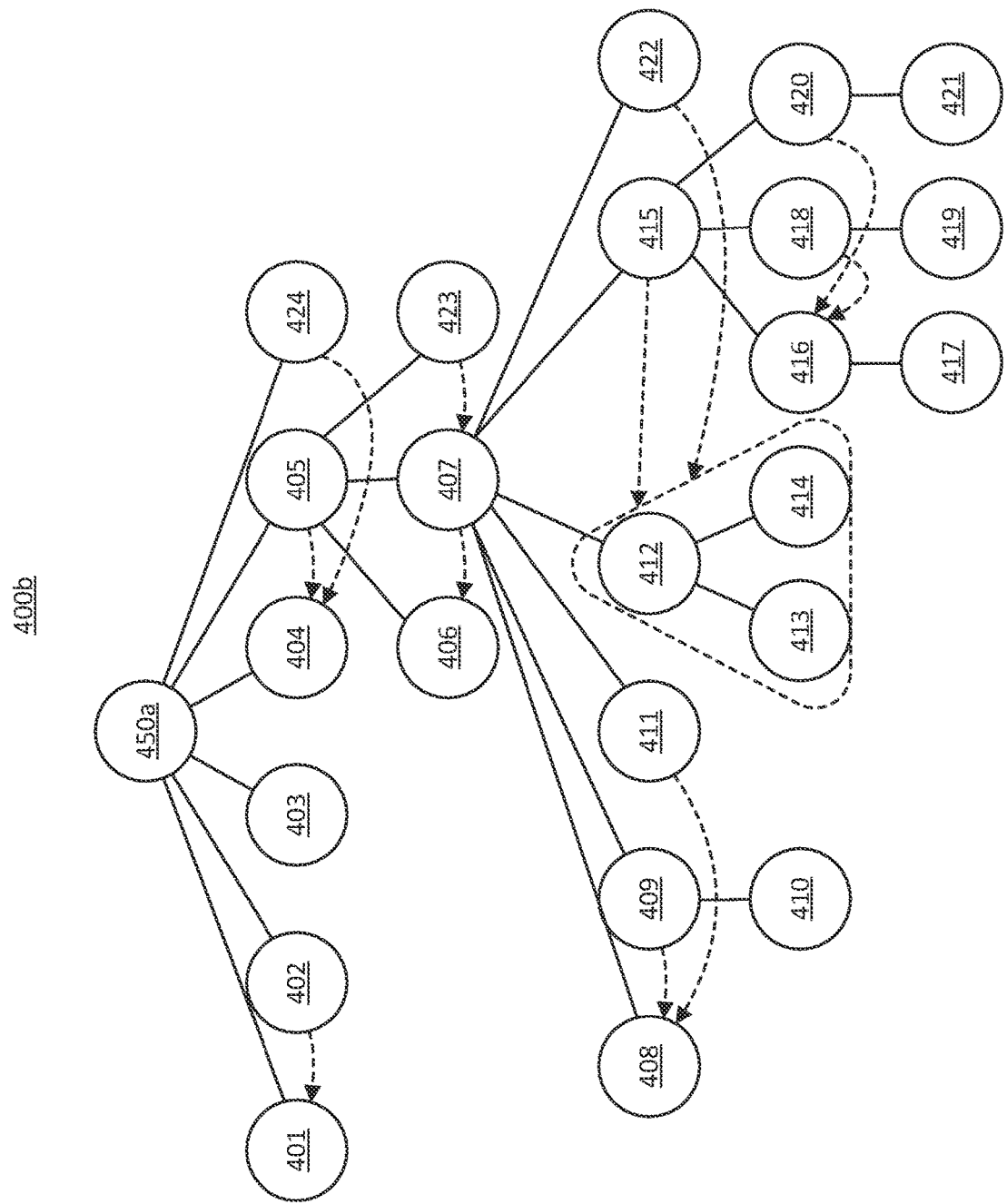
FIG. 4B illustrates an example of syntactic refinements that could be applied to the ordered code structure tree of FIG. 4A.

FIG. 4B illustrates an example 400*b* of possible syntactic refinements that could be applied to the ordered code structure tree of FIG. 4A. In particular, example 400*b* shows that node 402 could be regrouped as a child of node 401 (e.g., based on a '//' continuation symbol), that node 405 and/or node 424 could be regrouped as children of node 404 (e.g., based on beginning and/or ending brace control symbols), that node 407 and/or node 423 could be regrouped as children of node 406 (e.g., based on beginning and/or ending brace control symbols), that node 409 and/or node 411 could be regrouped as children of node 408 (e.g., based on beginning and/or ending brace control symbols), that node 415 and/or node 422 could be regrouped in association with node 412 (e.g., based on beginning and/or ending brace control symbols), and that node 418 and/or node 420 could be regrouped as children of node 416 (e.g., based on same-level control flow using the 'else' keyword). Example 400b also shows that node 412, node 413, and node 414 can be grouped under a new virtual node, since node 413 and node 414 correspond to lines defining parameters of the function declared at the line corresponding to node 412.

Figure 4C:
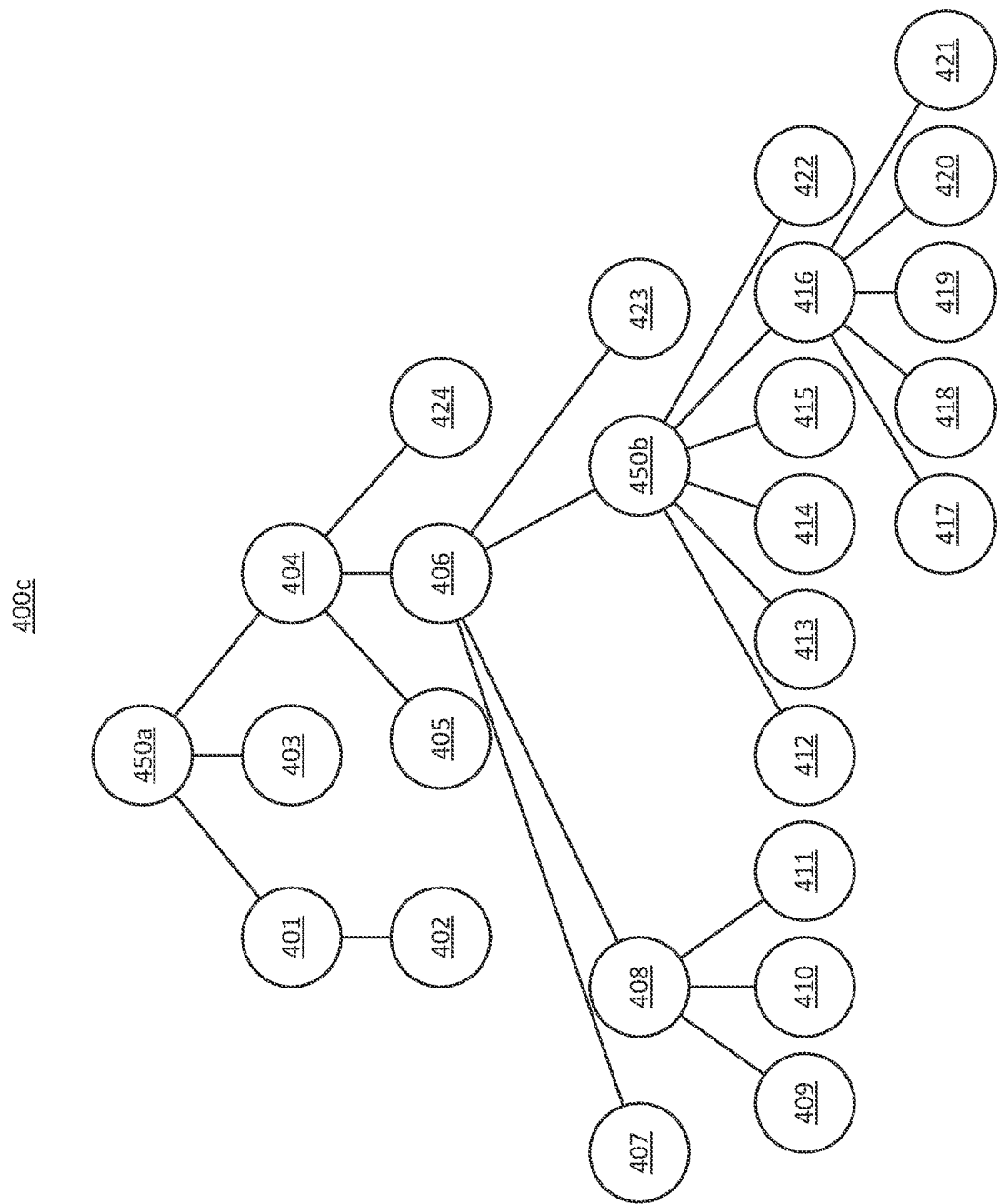
FIG. 4C illustrates an example of a refined code structure tree.

FIG. 4C illustrates an example 400c of a refined code structure tree, based on the syntactic refinements illustrated in example 400b. Notably, the refined code structure tree includes a node 450b, which is a new virtual node that that groups node 412, node 413, and node 414. Additionally, the refined code structure tree reflects the additional dependency changes described in connection with example 400b. As will be observed when comparing the code structure tree of example 400a with the refined code structure tree of example 400c, the refined code structure tree of example 400c even more closely corresponds to the structure of the source code 301. Thus, the refined code structure tree of example 400c provides additional insights into the source code 301, while still avoiding performing a full grammar-specific parsing of the source code 301.

The partial parser 109 includes a subtree identification component 207. In embodiments, the subtree identification component 207 identifies a subtree of a code structure tree 112, and a corresponding chunk of source code lines, that covers a requested source code line, which facilitates use of a generated code structure tree (e.g., code structure tree 112) by a source code consumer 110 as part of a source code action.

The components of the partial parser 109 are now described in connection with FIG. 5, which illustrates a flow chart of an example method 500 for inferring source code structure based on indentation. In embodiments, instructions for implementing method 500 are encoded as computer-executable instructions (e.g., partial parser 109) stored on a computer storage media (e.g., storage media 104) that are executable by a processor (e.g., processor 102) to cause a computer system (e.g., computer system 101) to perform method 500.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 5:
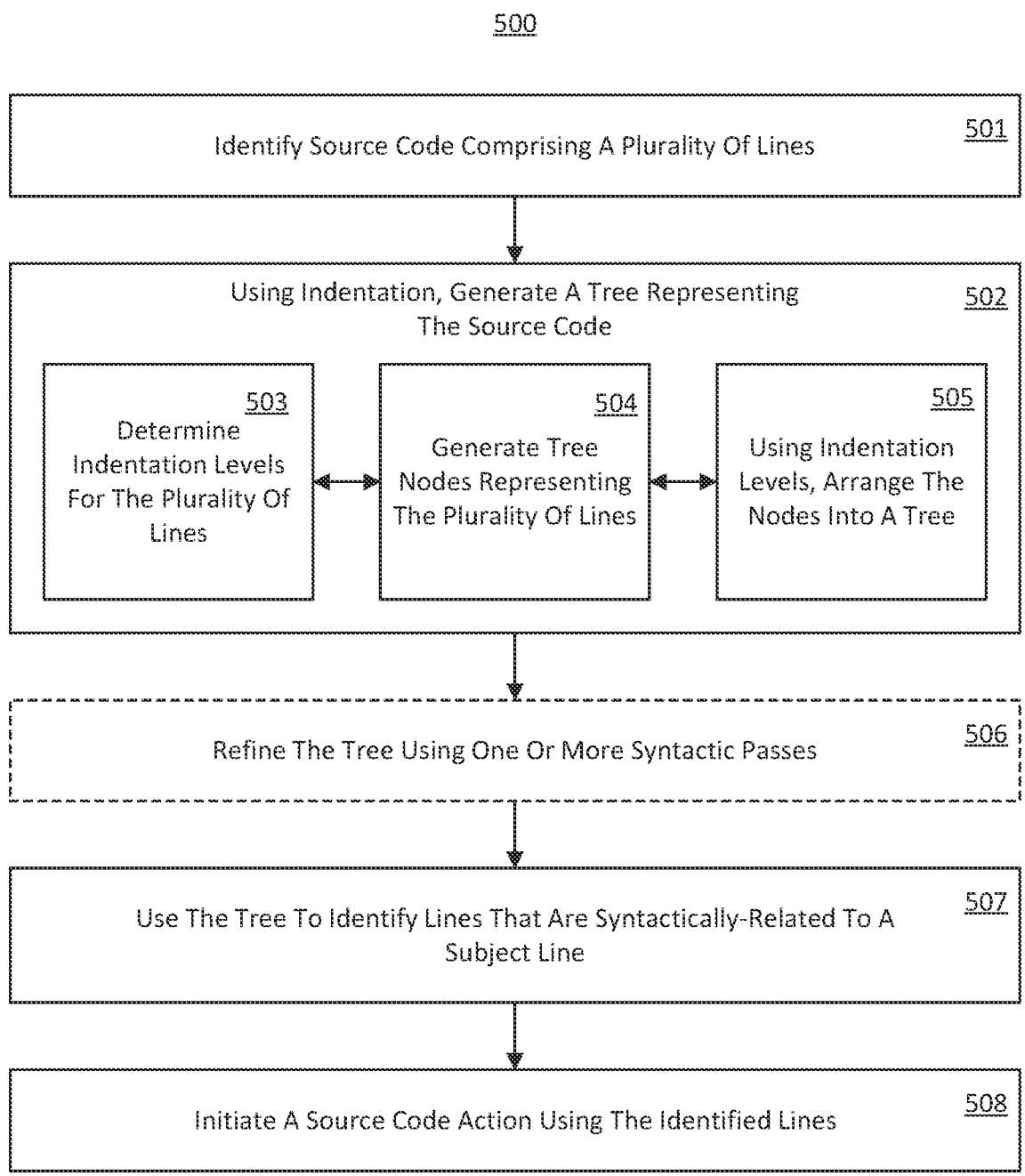
FIG. 5 illustrates a flow chart of an example method for inferring source code structure based on indentation.

Referring to FIG. 5, in embodiments, method 500 comprises an act 501 of identifying source code comprising a plurality of lines. In embodiments, act 501 comprises identifying a portion of source code comprising a plurality of lines. In an example, the source code identification component 201 identifies source code 111, of which source code 301 is provided as one example. As mentioned, in embodiments the source code 111 is a file stored on the storage media 104 and/or obtained from computer system(s) 108, or resides in the memory 103 as a buffer (e.g., a buffer within a code editor corresponding to the source code consumer 110).

Method 500 also comprises an act 502 of using indentation, generating a tree representing the source code. As shown, act 502 includes an act 503 of determining indentation levels for the plurality of lines; and act 504 of generating tree nodes representing the plurality of lines; and an act 505 of, using indentation levels, arranging the nodes into a tree. As shown, there is no ordering required among act 503, act 504, and act 505. In some embodiments, these acts are performed serially (e.g., act 503, then act 504, then act 505). In other embodiments, these acts are performed at least partially in parallel.

In embodiments, act 503 comprises determining a corresponding indentation level for each line in the plurality of lines. In an example, the indentation level identification component 203 identifies an indentation level for each line in source code 301. One example of potential indentation levels for the line of source code 301 is presented herein in Table 1. As noted, in embodiments, blank lines (e.g., lines containing no characters at all, or lines containing only whitespace characters) are grouped with their most recent non-blank ancestor. Thus, in some embodiments of act 503, determining the corresponding indentation level for each blank line in the plurality of lines comprises determining that each blank line has a same indentation level as an indentation level of a most recent non-blank line in the portion of the source code.

In embodiments, act 504 comprises generating a plurality of nodes that each represents a different line in the plurality of lines. In an example, from source code 301, the node generation component 204 generates node 401 (e.g., corresponding to line 01 of source code 301), node 402 (e.g., corresponding to line 02 of source code 301), and so on to node 424 (e.g., corresponding to line 24 of source code 301), as illustrated in FIG. 4A.

In embodiments, act 505 comprises arranging the plurality of nodes into an ordered tree based at least on the corresponding indentation level for each line in the plurality of lines. In an example, the node arrangement component 205 arranges the nodes generated in act 504 into the ordered code structure tree described in connection with example 400a.

As mentioned, example 400a includes a node 450a. In embodiments, node 450a is a virtual root node of the code structure tree and it represents, or otherwise corresponds to, the source code generally. Thus, in some embodiments of method 500, a root node of the ordered tree corresponds to the portion of the source code, and a set of children nodes of the root node corresponds to lines in the plurality of lines having a lowest indentation level.

As mentioned, if a line has a greater indentation level than its preceding line within source code 301, then a node corresponding to the line is arranged a child of a node that corresponds to the preceding line. Thus, in embodiments, arranging the plurality of nodes into ordered the tree includes arranging a first node representing a first line in the plurality of lines as a parent of a second node representing a second line in the plurality of lines based on the second line being after the first line within the plurality of lines, and based on the second line having a greater indentation level than the first line.

As also mentioned, if a line has the same indentation level as its preceding line within source code 301, then a node corresponding to the line is arranged as a sibling of a node that corresponds to the preceding line. Thus, in embodiments, arranging the plurality of nodes into the ordered tree includes arranging a first node representing a first line in the plurality of lines as a sibling of a second node representing a second line in the plurality of lines based on the second line being after the first line within the plurality of lines, and based on the second line having a same indentation level as the first line.

As also mentioned, if a line has a lower indentation level than its preceding line within source code 301, then a node corresponding to the line may be arranged as sibling of a node corresponding to the most recent line having that lower indentation level. Thus, in embodiments, arranging the plurality of nodes into the ordered tree may include arranging a first node representing a first line in the plurality of lines as a sibling of a second node representing a second line in the plurality of lines based on the second line being prior to the first line within the plurality of lines, and based on the second line having a same indentation level as the first line. However, exceptions may exist, such as the offside indentation example discussed previously.

In some embodiments, method 500 also comprises an act 506 of refining the tree using one or more syntactic passes. As mentioned, in a first embodiment, a syntactic refinement component 206 labels nodes to identify common source code constructs, like classes or functions. Thus, in some embodiments, act 506 comprises labeling a particular node in the plurality of nodes based on a current arrangement of the plurality of nodes, and based on a code structure defined by a line represented by the particular node. As mentioned, the syntactic refinement component 206 may operates in an iterative, multi-pass manner which can repeat a given refinement type using any number of passes. Thus, in some embodiments, labeling a particular node in the plurality of nodes is also based on one or more other label in the plurality of nodes.

As mentioned, in a second embodiment, the syntactic refinement component 206 regroups nodes as subordinate clauses to their parents, such as based on common "continuation" words or symbols. Thus, in some embodiments, act 506 additionally, or alternatively comprises identifying a first node and a second node within the ordered tree, wherein the first node and the second node are siblings within the ordered tree; determining that a second line represented by the second node has a syntactic dependency on a first line represented by the first node; and based on the syntactic dependency, arranging the second node as a child of the first node within the ordered tree.

As mentioned, in a third embodiment, the syntactic refinement component 206 regroups nodes based on insertion of a virtual node into the code structure tree. Thus, in some embodiments, act 506 additionally, or alternatively comprises creating a new virtual node, which does not correspond to any line of source code, within the ordered tree; and re-arranging one or more existing nodes as children of the new virtual node. Notably, the creation of the new virtual node and the re-arranging of existing nodes as children of the new virtual node could be performed in a single pass by the syntactic refinement component 206, or in multiple passes (e.g., creating the new virtual node in one pass, and re-arranging other nodes as its children in one or more other passes). Notably, the syntactic refinement component 206 may label this new virtual node, as well as normal nodes.

In embodiments, method 500 includes use of a generated code structure tree (e.g., code structure tree 112) by a source code consumer 110 as part of a source code action. In embodiments, these source code actions include identification, using the subtree identification component 207, of a chunk of a plurality of source code lines that are contextually-relevant to an identified source code line. In embodiments, based on an identified source code line, the subtree identification component 207 identifies a chunk of source code lines that correspond to a subtree within the code structure tree 112 that includes a node corresponding to the identified source code line. For example, given a source code line within a function, subtree identification component 207, identifies a subtree of nodes (and corresponding source code lines) within a code structure tree 112 that correspond to that function. The nature of the source code consumer 110, and the source code action, can vary widely.

In one example, a code structure tree 112 generated by the partial parser 109 is utilized by a code editor to provide intelligent source code completion suggestions based on understanding the overall structure of the code being authored. For example, a code editor may utilize a language generation artificial (AI) intelligence model to generate code suggestions at a given prompt location within an editor. In this example, a code structure tree 112 generated by the partial parser 109 can be used to identify a chunk of code to provide as a prompt for the language generation AI model.

In another example, a code structure tree 112 generated by the partial parser 109 can be used to facilitate a "code folding" a user interface feature, which allows hiding connected lines of code under a single heading. In this example, using a code structure tree 112 could support recursive folding (e.g., one fold could contain sub-folds).

In another example, a code structure tree 112 generated by the partial parser 109 can be used to facilitate "diff" viewing, by using code structure tree 112 to help guide how much context of code to show around a modified code snippet, thereby showing coherent chunks of code that makes sense to a reader.

In another example, a code structure tree 112 generated by the partial parser 109 can be used to search for related snippets of code in a file, such as by using the code structure tree 112 to select (potentially several) contexts around a line at which a cursor is positioned, and/or to select coherent chunks of code in other files.

In accordance with the foregoing, method 500 also comprises an act 507 of using the tree to identify lines that are syntactically-related to a subject line. In embodiments, act 507 comprises, based on an identified line in the plurality of lines, identifying, from the ordered tree, a subtree that comprises a node representing the identified line; identifying a subset of the plurality of nodes that correspond to the subtree; and identifying a subset of the plurality of lines that are represented by the subset of the plurality of nodes as being syntactically-related to the identified line. In an example, the subtree identification component 207 receives line 19 of source code 301 as a line of interest. Then, using the code structure tree 112 as illustrated in FIG. 4C, the subtree identification component 207 identifies a subtree (and corresponding lines) that includes a node (e.g., node 419) corresponding to the line of interest. For example, the subtree can include node 416 and descendants (e.g., the entire if block, including lines 16 to 21), node 450b and descendants (e.g., the entire NumberCompare method, including lines 12-22), and so on.

Method 500 also comprises an act 508 of initiating a source code action using the identified lines. In embodiments, act 508 comprises initiating a source code action based on the subset of the plurality of lines. In view of the examples provided above, in various embodiments act 508 may comprise the subtree identification component 207 and/or the source code consumer 110 initiating a source code action comprising inserting the subset of the plurality of lines into a language generation model prompt; initiating a code folding action, on the subset of the plurality of lines, within a code editor interface; visually displaying the subset of the plurality of lines as being contextually-relevant to the identified line; and the like.

Embodiments of the disclosure may comprise or utilize a special-purpose or general-purpose computer system (e.g., computer system 101) that includes computer hardware, such as, for example, one or more processors (e.g., processor 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for inferring source code structure based on indentation, the method comprising:
    identifying a portion of source code comprising a plurality of lines;
    determining a corresponding indentation level for each line in the plurality of lines;
    generating a plurality of nodes that each represents a different line in the plurality of lines;
    arranging the plurality of nodes into an ordered tree based at least on the corresponding indentation level for each line in the plurality of lines;
    based on an identified line in the plurality of lines:
        identifying, from the ordered tree, a subtree that comprises a node representing the identified line;
        identifying a subset of the plurality of nodes that correspond to the subtree; and
        identifying a subset of the plurality of lines that are represented by the subset of the plurality of nodes as being syntactically-related to the identified line; and
    initiating a source code action based on the subset of the plurality of lines.

2. The method of claim 1, wherein a root node of the ordered tree corresponds to the portion of the source code, and wherein a set of children nodes of the root node corresponds to lines in the plurality of lines having a lowest indentation level.

3. The method of claim 1, wherein determining the corresponding indentation level for each blank line in the plurality of lines comprises determining that each blank line has a same indentation level as an indentation level of a most recent non-blank line in the portion of the source code.

4. The method of claim 1, wherein arranging the plurality of nodes into the ordered tree includes arranging a first node representing a first line in the plurality of lines as a parent of a second node representing a second line in the plurality of lines based on the second line being after the first line within the plurality of lines, and based on the second line having a greater indentation level than the first line.

5. The method of claim 1, further comprising labeling a particular node in the plurality of nodes based on a current arrangement of the plurality of nodes, and based on a code structure defined by a line represented by the particular node.

6. The method of claim 1, further comprising:
    identifying a first node and a second node within the ordered tree, wherein the first node and the second node are siblings within the ordered tree;
    determining that a second line represented by the second node has a syntactic dependency on a first line represented by the first node; and
    based on the syntactic dependency, arranging the second node as a child of the first node within the ordered tree.

7. The method of claim 1, further comprising:
    creating a new virtual node, which does not correspond to any line of source code, within the ordered tree; and
    re-arranging one or more existing nodes as children of the new virtual node.

8. The method of claim 1, wherein initiating the source code action comprises inserting the subset of the plurality of lines into a language generation model prompt.

9. The method of claim 1, wherein initiating the source code action comprises initiating a code folding action, on the subset of the plurality of lines, within a code editor interface.

10. The method of claim 1, wherein initiating the source code action comprises visually displaying the subset of the plurality of lines as being contextually-relevant to the identified line.

11. A computer system for inferring source code structure based on indentation, comprising:
    a processor; and
    a computer storage media that stores computer-executable instructions that are executable by the processor to cause the computer system to at least:
        identify a portion of source code comprising a plurality of lines;
        determine a corresponding indentation level for each line in the plurality of lines;
        generate a plurality of nodes that each represents a different line in the plurality of lines;
        arrange the plurality of nodes into an ordered tree based at least on the corresponding indentation level for each line in the plurality of lines;
        based on an identified line in the plurality of lines:
            identify, from the ordered tree, a subtree that comprises a node representing the identified line;
            identify a subset of the plurality of nodes that correspond to the subtree; and
            identify a subset of the plurality of lines that are represented by the subset of the plurality of nodes as being syntactically-related to the identified line; and
        initiate a source code action based on the subset of the plurality of lines.

12. The computer system of claim 11, wherein a root node of the ordered tree corresponds to the portion of the source code, and wherein a set of children nodes of the root node corresponds to lines in the plurality of lines having a lowest indentation level.

13. The computer system of claim 11, wherein determining the corresponding indentation level for each blank line in the plurality of lines comprises determining that each blank line has a same indentation level as an indentation level of a most recent non-blank line in the portion of the source code.

14. The computer system of claim 11, wherein arranging the plurality of nodes into the ordered tree includes arranging a first node representing a first line in the plurality of lines as a parent of a second node representing a second line in the plurality of lines based on the second line being after the first line within the plurality of lines, and based on the second line having a greater indentation level than the first line.

15. The computer system of claim 11, wherein the computer-executable instructions also include instructions that are executable by the processor to cause the computer system to:
- label a particular node in the plurality of nodes based on a current arrangement of the plurality of nodes, and based on a code structure defined by a line represented by the particular node.

16. The computer system of claim 11, wherein the computer-executable instructions also include instructions that are executable by the processor to cause the computer system to at least:
- identify a first node and a second node within the ordered tree, wherein the first node and the second node are siblings within the ordered tree;
- determine that a second line represented by the second node has a syntactic dependency on a first line represented by the first node; and
- based on the syntactic dependency, arrange the second node as a child of the first node within the ordered tree.

17. The computer system of claim 11, wherein the computer-executable instructions also include instructions that are executable by the processor to cause the computer system to at least:
- create a new virtual node, which does not correspond to any line of source code, within the ordered tree; and
- re-arrange one or more existing nodes as children of the new virtual node.

18. The computer system of claim 11, wherein initiating the source code action comprises at least one of:
- inserting the subset of the plurality of lines into a language generation model prompt;
- initiating a code folding action, on the subset of the plurality of lines, within a code editor interface; or
- visually displaying the subset of the plurality of lines as being contextually-relevant to the identified line.

19. A computer program product comprising a computer storage media that stores computer-executable instructions that are executable by a processor to cause a computer system to infer source code structure based on indentation, the computer-executable instructions including instructions that are executable by the processor to cause the computer system to at least:
- identify a portion of source code comprising a plurality of lines;
- determine a corresponding indentation level for each line in the plurality of lines;
- generate a plurality of nodes that each represents a different line in the plurality of lines;
- arrange the plurality of nodes into an ordered tree based at least on the corresponding indentation level for each line in the plurality of lines;
- based on an identified line in the plurality of lines:
  - identify, from the ordered tree, a subtree that comprises a node representing the identified line;
  - identify a subset of the plurality of nodes that correspond to the subtree; and
  - identify a subset of the plurality of lines that are represented by the subset of the plurality of nodes as being syntactically-related to the identified line; and
- initiate a source code action based on the subset of the plurality of lines.

20. The computer program product of claim 19, wherein the computer-executable instructions also include instructions that are executable by the processor to cause the computer system to at least:
- identify a first node and a second node within the ordered tree, wherein the first node and the second node are siblings within the ordered tree;
- determine that a second line represented by the second node has a syntactic dependency on a first line represented by the first node; and
- based on the syntactic dependency, arrange the second node as a child of the first node within the ordered tree.

* * * * *